Patented Aug. 16, 1938

2,126,839

UNITED STATES PATENT OFFICE 2,126,839

BREAKING PETROLEUM EMULSIONS

James G. Suthard, Chicago, Ill., assignor, by mesne assignments, to The Pure Oil Company, Chicago, Ill., a corporation of Ohio No Drawing. Application December 7, 1934, Serial No. 756,479

9 Claims. (Cl. 196—4)

This invention relates to a method of and reagents for breaking emulsions. More specifically the invention is concerned with a novel method for resolving various types of water-in-oil emulsions and to reagents effective in separating such emulsions into distinct phases so that the oil can be freed from the water.

In many localities, petroleum as pumped from the well is emulsified with water or brine and must be separated from the aqueous phase prior to refining. In addition, to the crude oil emulsions, other oil emulsions known as slop oil or B. S. accumulate around refineries. Slop oil is a conglomeration of refinery wastes such as residuums from cracking stills, residuums from straight run stills and sludges resulting from chemical refining of various oil fractions. These various products may be run through ditches to sumps where they are collected to be treated and used for cracking stock or fuel oil. The products become emulsified with water on their way to the sumps and the resulting emulsion is usually more difficult to break than crude oil emulsions. In some cases these emulsions are so tight that they will not yield satisfactorily to known demulsifying agents.

Various methods have been proposed to break oil emulsions with a varying amount of success. Although some reagents will partially or completely resolve some types of emulsions, other emulsions will not yield satisfactorily to the same treatment. Various mixtures and combinations have been tried which contain constituents which alone are capable of partially resolving such emulsions. In some cases such mixtures are less effective than some of the constituents contained therein.

One of the objects of my invention is to provide a reagent capable of quickly breaking water-in-oil emulsions.

Another object of my invention is to provide a method of preparing a demulsifying agent capable of rapidly resolving tight emulsions.

A further object of my invention is to provide a method of breaking petroleum emulsions of the water-in-oil type.

Still further objects of my invention will appear from the following detailed description.

In my copending application Serial No. 755,515 filed December 7, 1934 I have disclosed and claimed reagents for and method of breaking petroleum emulsions in which a reagent comprising aldehyde and naphthenic acid soaps in alcoholic solution are utilized. The reagent which forms a part of the present invention is even more efficacious in resolving tight emulsions than the reagent disclosed in the aforesaid application since an equivalent amount of reagent will break the emulsion almost instantaneously upon addition thereto. The reagent of the present invention comprises alkali or alkali earth metal soaps of sulfonated hydrocarbon polymers.

In the refining of light distillates resulting from cracking of oil in the liquid or vapor phase, polymerization of the gum forming constituents contained in the distillates takes place and the polymers, because of their high boiling point, can be separated from the distillates by fractionation. These polymers may result from rerunning of cracked distillates or from treatment of such distillates in a liquid or vapor phase at elevated temperatures with or without solid catalytic adsorbent material such as fuller's earth, or by treatment with other polymerizing agents such as sulfuric acid and aluminum chloride. The polymers are partially unsaturated and the amount of unsaturation depends chiefly upon whether the distillates result from vapor phase or liquid phase cracking. Vapor phase cracked distillates yield polymers which, because of their high unsaturation, are particularly suitable in preparing the reagent which forms a part of my invention.

In preparing the reagent the polymers obtained in a manner above mentioned are mixed with sulfuric acid of fairly high concentration, preferably between 80 and 100%. The sulfuric acid is preferably diluted with acetic acid or other diluent in order to inhibit too violent reaction between the acid and the polymers. If concentrated sulfuric acid alone is used to react with the polymers it becomes reduced to sulfur and the resulting product is unsatisfactory. Other lower members of the fatty acid group may be used such as propionic and butyric. Moreover, saturated hydrocarbons such as hexane, heptane, and octane may be used in place of acetic acid. Boric acid, which has been dehydrated at 110° C., also acts as a suitable retarding agent when dissolved in sulfuric acid. Other diluents which are not readily attacked by sulfuric acid and which have a solvent action on the resulting sludge are suitable for use in my process.

Glacial acetic acid is preferably mixed with the sulfuric acid in the proportion of 1 part of the former to 3 parts by volume of the latter before adding the acid to the polymers. The sulfonation of the polymers takes place at ordinary or at elevated temperatures but preferably without the addition of heat since the reaction is exothermic. The amount of sulfuric acid to be reacted with the polymers will depend upon the unsaturation of the polymers, but I have found that when using polymers resulting from the vapor phase clay treatment of gasoline cracked in the vapor phase, 20% by volume of sulfuric acid based on the volume of polymers gives satisfactory results. In adding the acid to the polymers it should be added slowly in small increments with continuous stirring. After the required amount of acid has been added, the mixture is permitted to stand for about an hour and then washed with a saturated solution of sodium sulfate in order to remove excess acetic and sulfuric acid. The sulfonated polymers are insoluble in the sodium sulfate solution. Washing with alkali solution should be avoided at this point since emulsification takes place with the result that the free acids cannot be removed from the mixture. The resulting product is then made alkaline with sodium hydroxide preferably used in a form of saturated solution and as a result a sodium sulfo-compound of the polymers is formed. In order to obtain this compound in a substantially pure form it is extracted with 95% ethyl alcohol, the sodium sulfo-compounds going into solution in the alcohol and leaving unreacted material undissolved. The extract is then distilled in order to recover the alcohol and the purified sodium sulfo-polymers.

In addition to acting as a retarding agent on the action of the sulfuric acid, the acetic acid acts as a solvent for the sulfo-compounds which form as a result of the action of the sulfuric acid on the polymers and thereby keeps the reaction product from precipitating in a solid or semi-solid mass. In the absence of acetic acid or other solvent, a viscous sludge forms upon contacting the polymers with sulfuric acid, which prevents the acid from further acting on the polymers.

Since the product prepared as just described is a semi-solid plastic mass, in breaking emulsions I preferably add to it a carrying agent such as modified or unmodified heavy fatty acid bodies. For this purpose sulfonated castor oil, otherwise known as Turkey red oil, is particularly satisfactory. However, it will be understood that other sulfonated fatty oils or acids such as sulfonated oleic acid as well as straight fatty oils or acids such as stearic acid may be used. The alkali reaction product of the sulfonated polymers is not soluble in or miscible with the emulsion to be treated. Consequently I find it expedient to add a carrying agent such as sulfonated castor oil in which the polymer product is soluble and which itself is soluble in or miscible with the emulsion. In addition the carrying agent may assist to some extent in breaking the emulsion. The neutralized sulfonated polymers may be mixed with the carrying medium in the proportion of 40% of polymers to 60% by volume of carrying medium.

In treating emulsions with reagent prepared as above described, the reagent is preferably added to the emulsion in the proportion of 1 gallon of reagent per 100 barrels of emulsion. This proportion may be varied and it is within the scope of my invention to add up to 10 gallons of the reagent per 100 barrels of the emulsion. Due to the rapidity with which the reagent acts to break emulsions, the process is preferably carried out in continuous manner, but it is understood that a batch process may be used if desired. The treatment is preferably carried out at elevated temperatures of approximately 120 to 150° F. in order to expedite the breaking of the emulsion, but in cases of emulsions which are not too viscous at ordinary temperatures, the treatment may take place without heating. It is also within the scope of my invention to treat at more elevated temperatures, particularly in the case of very viscous emulsions, and when treating at high temperatures it may be desirable to do so in a closed system under super-atmospheric pressure in order to prevent loss of light oil fractions.

As a specific example of my invention, 1,500 barrels of crude oil containing 16% of bottom settlings and water were treated with 4½ gallons of sulfonated polymer soaps prepared in the manner above described and dissolved in sulfonated castor oil. The reagent was added by means of a lubricator to a flowing stream of the emulsified oil and the mixture was passed through a body of water maintained at a temperature of 150° F. The emulsion began to break almost instantaneously and upon settling for a short time a clear separation between the oil and water took place. The resulting oil had a B. S. & W. of less than 0.5%.

Although I have described the treatment of crude oil in my specific example, it is to be understood that the invention is applicable to all types of oil-water emulsions in which the water is in the dispersed phase. It will be further understood that although I have given specific proportions of ingredients in preparing my reagent and in treating oil therewith, the invention is not limited to these specific proportions but these proportions may be varied within a wide range.

What is claimed is:

1. A demulsifying agent for breaking emulsions of water in petroleum oil comprising a sulfonated hydrocarbon polymer soap, prepared from polymers obtained by the treatment of light cracked petroleum distillates with solid, polymerizing, adsorbent catalyst at elevated temperatures.

2. Demulsifying agent in accordance with claim 1 in which the polymers are obtained from distillate produced by vapor phase cracking.

3. Demulsifying agent in accordance with claim 1 in which the soap is a sodium soap mixed with a carrier liquid selected from the group consisting of fatty and modified fatty oils.

4. The method of breaking emulsions of water in petroleum oil which comprises mixing said emulsions with sulfonated polymer soap, the polymer in which is obtained from the polymerization of the gum-forming constituents of vapor phase cracked gasoline by means of an agent having the polymerizing action of solid catalytic adsorptive material.

5. Method in accordance with claim 4 in which the soap is the sodium soap.

6. The method of breaking emulsions of water in petroleum oil which comprises mixing said emulsions with a sulfonated polymer soap, the polymer in which is prepared by contacting vapor phase cracked gasoline with solid catalytic adsorptive material under conditions suitable for polymerizing the gum-forming constituents in the gasoline.

7. Method in accordance with claim 6 in which the soap is the sodium soap.

8. The method of preparing a demulsifying agent for petroleum emulsions which comprises mixing sulfuric acid with glacial acetic acid, sulfonating unsaturated hydrocarbon polymers, the polymers in which are extracted from cracked petroleum distillates, with the mixed acids, and neutralizing the resulting product.

9. Method in accordance with claim 8 in which the polymers are extracted by treating the cracked distillate with solid adsorptive catalytic material under conditions suitable for polymerizing the gum-forming constituents in the gasoline.

JAMES G. SUTHARD.